(12) United States Patent
Nagle et al.

(10) Patent No.: US 9,505,486 B2
(45) Date of Patent: Nov. 29, 2016

(54) PROPELLER BLADE HAVING COMPLIANT ADHESIVE AT SPAR INTERFACE

(71) Applicants: David P. Nagle, Westfield, MA (US); Ludovic Prunet, Themines (FR); Patrice Brion, Lunan (FR)

(72) Inventors: David P. Nagle, Westfield, MA (US); Ludovic Prunet, Themines (FR); Patrice Brion, Lunan (FR)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 676 days.

(21) Appl. No.: 13/689,959

(22) Filed: Nov. 30, 2012

(65) Prior Publication Data

US 2013/0136614 A1    May 30, 2013

(30) Foreign Application Priority Data

Nov. 30, 2011    (EP) ..................................... 11306586

(51) Int. Cl.
*B64C 11/26*    (2006.01)

(52) U.S. Cl.
CPC .......... *B64C 11/26* (2013.01); *Y10T 29/49332* (2015.01)

(58) Field of Classification Search
CPC ....... B64D 11/00; B64D 11/16; B64D 11/20; B64D 11/22; B64D 11/24; B64D 11/26
See application file for complete search history.

(56) References Cited

U.S. PATENT DOCUMENTS

| 3,873,654 | A | * | 3/1975 | Smith | ..................... B29C 67/20 156/245 |
| 4,470,862 | A | * | 9/1984 | More | ..................... B29C 70/34 156/217 |
| 4,471,020 | A | * | 9/1984 | McCarthy | ................. 428/309.9 |
| 4,648,921 | A | * | 3/1987 | Nutter, Jr. | ............... B29C 70/08 156/242 |
| 4,892,462 | A |   | 1/1990 | Barbier et al. | |
| 5,042,968 | A |   | 8/1991 | Fecto | |
| 5,222,297 | A | * | 6/1993 | Graff | ..................... B29C 70/865 29/889.7 |
| 6,630,093 | B1 | * | 10/2003 | Jones | ........................... 264/401 |

FOREIGN PATENT DOCUMENTS

| GB | 2120599 A | 12/1983 |
| GB | 2237532 A | 5/1991 |

OTHER PUBLICATIONS

Hysol XEA 9690 Modified Epoxy Film Adhesive, Henkel Corporation, Apr. 2011, 4 Pages.*
Hysol XEA 9695 Epoxy Film Adhesive, Henkel Corporation, Jan. 2001, 4 Pages.*
Structural Adhesive Solutions for Composite Repair, Henkel Corporation, 2013, 4 Pages.*
Hysol EA 9695 Excellence in COmposite Bond Repair, Henkel Corporation, Jun. 2009, 2 Pages.*
European Search Report for Application No. EP 11 30 6586 Mailed Jun. 6, 2012. 6 pages.

* cited by examiner

*Primary Examiner* — Richard Edgar
(74) *Attorney, Agent, or Firm* — Cantor Colburn LLP

(57) ABSTRACT

A propeller blade includes a foam core, an adhesive layer formed on the core and a structural layer that covers at least a portion of the adhesive layer and that surrounds at least a portion of the foam core.

11 Claims, 2 Drawing Sheets

PROPELLER BLADE HAVING COMPLIANT ADHESIVE AT SPAR INTERFACE

PRIORITY CLAIM

This application claims priority to European Patent Application No. 11306586.6, filed Nov. 30, 2011, and all the benefits accruing therefrom under 35 U.S.C. §119, the contents of which in its entirety are herein incorporated by reference.

BACKGROUND OF THE INVENTION

The present invention relates to propellers and, in particular, to propeller blades formed having a foam spar core.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade includes a foam core, an adhesive layer formed on the core and a structural layer that covers at least a portion of the adhesive layer and that surrounds at least a portion of the foam core.

According to another embodiment, a method of forming a propeller blade includes: forming a foam core; coating at least a portion of the form core with an adhesive layer; and disposing a structural layer over at least a portion of the foam core such that it covers at least a portion of the adhesive layer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
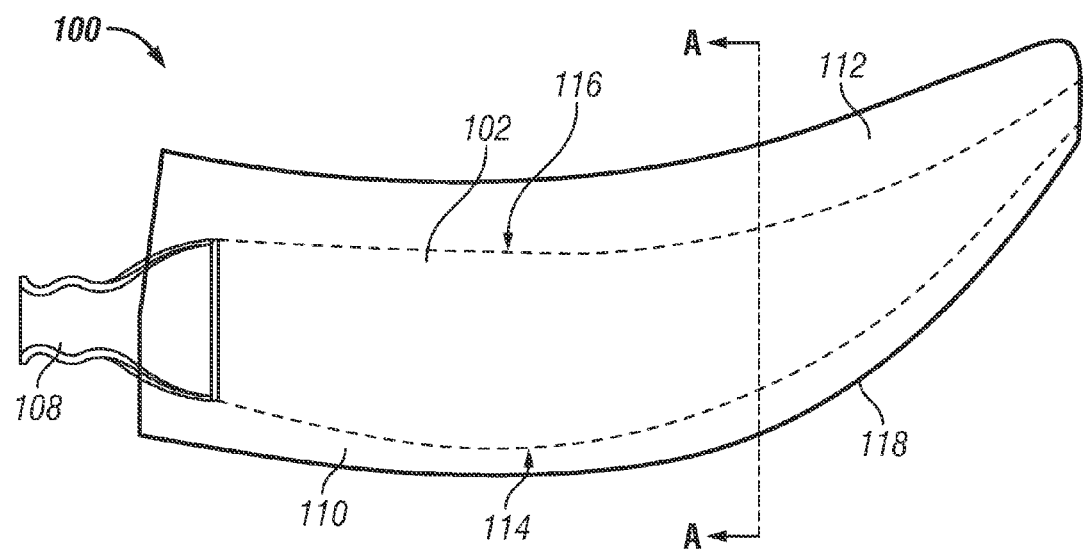
FIG. 1 is a plan-view of a prior art propeller blade.
Figure 2:
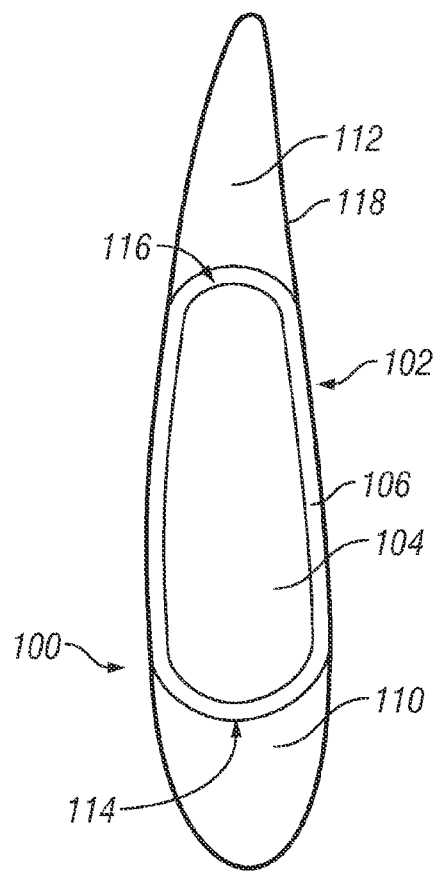
FIG. 2 is a cross-section of the propeller blade shown in FIG. 1.

Referring now to FIG. 1, a plan view of a conventional propeller blade 100 is illustrated and will be used to define certain terms, explain how a propeller blade is generally made, and to illustrate the differences between embodiments of the present invention and the prior art. Reference will also be made to FIG. 2, which is a cross-section of the propeller blade 100 of FIG. 1 taken along line A-A, for these purposes.

The blade 100 is formed by first forming a spar 102. The spar 102 includes a spar foam core 104 surrounded by a structural layer 106. The core 104 is typically formed of a foam material that is injected into a mold. The mold can include a layer of fiberglass on the walls thereof that to which the foam of the core 104 adheres. As such, the core 104 can be surrounded by a layer of fiberglass (not shown).

The structural layer 106 is typically formed of a resin-impregnated fabric material (e.g. resin impregnated braided carbon) and disposed such that it surrounds the core 104 (and the fiberglass layer if it is included). In some cases, the spar 102 is heated to set the resin in the structural layer 106. Considerable thermal stresses can occur in the core 104 as the spar 102 is cooled due to the differences in the coefficients of thermal expansion (CTE) of the core 104 and the structural layer 106.

In some instances, the spar 102 is formed such that a portion of it is surrounded by a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 110 and trailing edge foam 112 are formed on the leading and trailing edges 114, 116, respectively of the spar 102. The leading edge foam 110, trailing edge foam 112 and the spar 102 can then be encased in an outer layer 118. The outer layer 118 can be formed of Kevlar and be in the form of a sock that is pulled over the assembly that includes the leading edge foam 110, trailing edge foam 112 and the spar 102. Of course, the outer layer 118 could be formed in other manners as well.

As described above, considerable thermal stresses can occur in the core 104 as the spar 102 is cooled due to the differences in the coefficients of thermal expansion (CTE) of the core 104 and the structural layer 106. These stresses can lead to the cracking of the core 104. In addition, thermal stresses can be created between the core 104 and the structural layer 106 due to the wide range of temperatures experienced by the propeller blade 100 in normal operation.

Figure 3:
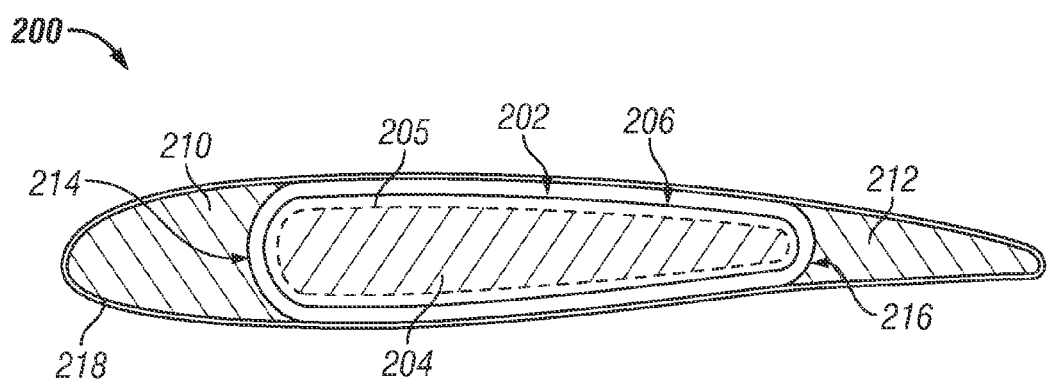
FIG. 3 is cross-section of a propeller blade according to one embodiment of the present invention.

FIG. 3 illustrates a cut-away side view of a propeller blade 200 according to one embodiment of the present invention. The blade 200 is formed by first forming a spar 202. The spar 202 includes a spar foam core 204. The core 204 is typically formed of a foam material that is injected into a mold and can optionally be surrounded by a layer of fiberglass (not shown) in the same manner as described above. Examples of suitable foams that can be used to form the core 204 include polyurethane foam, polyisocyanurate foam, or polymethacrylimide. According to this embodiment, an adhesive layer 205 is formed on the outside of the core 204. The adhesive layer 205 is formed of an elastomeric or other high strain rate adhesive material. Examples of suitable adhesives include polyurethane adhesive and polysulfide adhesive.

A structural layer 206 can then be formed around the adhesive layer 205. In one embodiment, the structural layer 206 is formed of a resin-impregnated fiber material, such as a resin-impregnated braided carbon sheet, and disposed such that it surrounds the core 204 (and the fiberglass layer if present). In some cases, the spar 202 is heated to set the resin in the structural layer 206. In contrast to the prior art, due to the inclusion of the adhesive layer 205, the thermal stresses that can occur in the core 204 as the spar 202 is cooled can be reduced. Such a reduction in thermal stresses can prevent or reduce cracking of the core 204.

While not illustrated in FIG. 3, the spar 202 can be formed such that a portion of it is surrounded by a root portion that allows the blade 200 to be connected to a hub (not shown). Rotation of the hub causes the blade 200 to rotate and, consequently, causes the generation of thrust to propel an aircraft.

After the spar 202 is formed, leading edge foam 210 and trailing edge foam 212 are formed on the leading and trailing edges 214, 216, respectively of the spar 202. The leading edge foam 210, trailing edge foam 212 and the spar 202 can then be encased in an outer layer 218. The outer layer 218 can be formed of Kevlar and in the form of a sock that is pulled over the assembly that includes the leading edge foam 210, trailing edge foam 212 and the spar 202. Of course, the outer layer 218 could be formed in other manners as well.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade comprising:
 a foam core;
 an elastomeric adhesive layer formed around the core;
 a structural layer that covers and contacts at least a portion of the adhesive layer and that surrounds at least a portion of the foam core, the structural layer being formed of fibers and a resin, the combination of the foam core, the adhesive layer and the structural layer forming a spar;
 leading edge foam disposed on one side of the spar;
 trailing edge foam disposed on an opposite side of the spar; and
 an outer layer surrounding the leading edge foam, the trailing edge foam and the spar.

2. The propeller blade of claim 1, further comprising:
 a root disposed at an end of the propeller blade.

3. The propeller blade of claim 2, wherein the root surrounds a portion of the foam core.

4. The propeller blade of claim 1, wherein the foam core is formed of polyurethane foam, polyisocyanurate foam, or polymethacrylimide foam.

5. The propeller blade of claim 1, wherein the structural layer is formed of a resin-impregnated braided carbon fiber sheet.

6. A method of forming a propeller blade comprising:
 forming a foam core;
 surrounding at least a portion of the form core with an elastomeric adhesive layer;
 disposing a structural layer, after surrounding at least a portion of the form core with an adhesive layer, over at least a portion of the foam core such that it covers and contacts at least a portion of the adhesive layer, the combination of the foam core, the adhesive layer and the structural layer forming a spar;
 forming leading edge foam on one side of the spar;
 forming trailing edge foam on an opposite side of the spar; and
 forming an outer layer around the leading edge foam, the trailing edge foam and the spar.

7. The method of claim 6, wherein forming a foam core includes injecting a foam into a form.

8. The method of claim 6, further comprising:
 coupling a root to the foam core.

9. The method of claim 6, wherein the foam core is formed of polyurethane foam polyisocyanurate foam and polymethacrylimide foam.

10. The method of claim 6, wherein the structural layer is formed of a resin-impregnated fiber material.

11. The method of claim 6, wherein the structural layer is formed of a resin-impregnated braided carbon fiber sheet.

* * * * *